US011797330B2

(12) United States Patent
Akkur Rajamannar et al.

(10) Patent No.: US 11,797,330 B2
(45) Date of Patent: Oct. 24, 2023

(54) SAVING AND RESTORING PRE-PROVISIONED VIRTUAL MACHINE STATES

(71) Applicant: Microsoft Technology Licensing, LLC, Redmond, WA (US)

(72) Inventors: Aswin Parthasarathy Akkur Rajamannar, Bothell, WA (US); Md Daud Hossain Howlader, Bothell, WA (US); Sushant Pramod Rewaskar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 17/119,932

(22) Filed: Dec. 11, 2020

(65) Prior Publication Data

US 2022/0188138 A1 Jun. 16, 2022

(51) Int. Cl.
*G06F 9/455* (2018.01)
*G06F 9/50* (2006.01)

(52) U.S. Cl.
CPC ........ *G06F 9/45558* (2013.01); *G06F 9/5072* (2013.01); *G06F 9/5077* (2013.01); *G06F 2009/4557* (2013.01); *G06F 2009/45575* (2013.01); *G06F 2009/45579* (2013.01); *G06F 2009/45595* (2013.01)

(58) Field of Classification Search
CPC ............... G06F 9/45558; G06F 9/5077; G06F 2009/4557; G06F 2009/45575; G06F 2009/45579; G06F 2009/45595
See application file for complete search history.

(56) References Cited

U.S. PATENT DOCUMENTS

| | | | |
|---|---|---|---|
| 9,323,565 B2 | 4/2016 | Li et al. | |
| 11,099,870 B1* | 8/2021 | Brooker | G06F 11/1446 |
| 2012/0144391 A1* | 6/2012 | Ueda | G06F 9/45558 |
| | | | 718/1 |
| 2014/0075031 A1* | 3/2014 | Doering | H04L 47/70 |
| | | | 709/226 |

(Continued)

OTHER PUBLICATIONS

"International Search Report and Written Opinion Issued in PCT Application No. PCT/US21/057466", dated Jan. 25, 2022, 10 Pages.

(Continued)

*Primary Examiner* — Dong U Kim
(74) *Attorney, Agent, or Firm* — Ray Quinney & Nebeker; James S. Bullough

(57) ABSTRACT

The present disclosure relates to systems, method, and computer-readable media to enable saving and restoring virtual machines (VMs) in a way that reduces time associated with booting VMs and reducing expense of memory resources on a cloud computing system. The systems described herein involve loading or otherwise pre-booting pre-provisioned VMs on server nodes and saving VM states of the pre-provisioned VMs within an accessible storage volume. Responsive to a received customer request, the systems described herein can restore the pre-provisioned VM from the saved VM state by bringing the VM back to a running state (e.g., responsive to a customer request). The systems described herein facilitate aggressive VM deployment prediction at minimal expense to available processing resources.

20 Claims, 7 Drawing Sheets

(56) References Cited

U.S. PATENT DOCUMENTS

2017/0168903 A1* 6/2017 Dornemann ........ G06F 11/2038
2019/0278620 A1   9/2019 Korbar et al.

OTHER PUBLICATIONS

Watkins, Daniel, "[Azure] Add ability to hot-attach NICs to Preprovisioned VMs before reprovision", Retrieved from: https://github.com/canonical/cloud-init/pull/613, Retrieved Date: Oct. 16, 2020, 10 Pages.

* cited by examiner

SAVING AND RESTORING PRE-PROVISIONED VIRTUAL MACHINE STATES

BACKGROUND

A cloud computing system refers to a collection of computing devices on which data can be remotely stored and accessed. For example, modern cloud computing infrastructures often include a collection of physical server devices organized in a hierarchical structure including computing zones (e.g., node clusters, virtual local area networks (VLANs), server racks, fault domains). Cloud computing systems often make use of different types of virtual services (e.g., computing containers, virtual machines) that provide remote storage and computing functionality to various clients and customers. These virtual services can be hosted by respective server nodes on a cloud computing system.

As demand for cloud computing resources continues to grow, the number and variety of virtual machines and other cloud-based services has also increased. Moreover, with more and more virtual machines being deployed daily, a growing number of computing resources are additionally needed to keep up with the increased demand. With this increase in volume and variety of virtual machines and other cloud-computing services, various innovations are being explored to facilitate faster booting and more efficient utilization of computing resources.

For example, in an effort to reduce the time between receiving a request for a virtual machine and providing the virtual machine to a customer, conventional systems attempt to pre-boot virtual machines that are ready for deployment. While pre-booting virtual machines that are ready for deployment provides faster service and an improved customer experience, pre-booting or otherwise pre-deploying virtual machines in this manner can become very expensive. Indeed, reserving memory resources for hundreds or thousands of virtual machines in this manner prevents many computing resources from being utilized for computing purposes. Moreover, while conventional systems may predict deployment of virtual machines over time with reasonable accuracy, pre-deploying virtual machines based on predictive algorithms still suffers from various inefficiencies and inaccuracies.

These and other problems exist with regard to providing virtual machines and other cloud-based services to customers of a cloud computing system.

DETAILED DESCRIPTION

Figure 1:
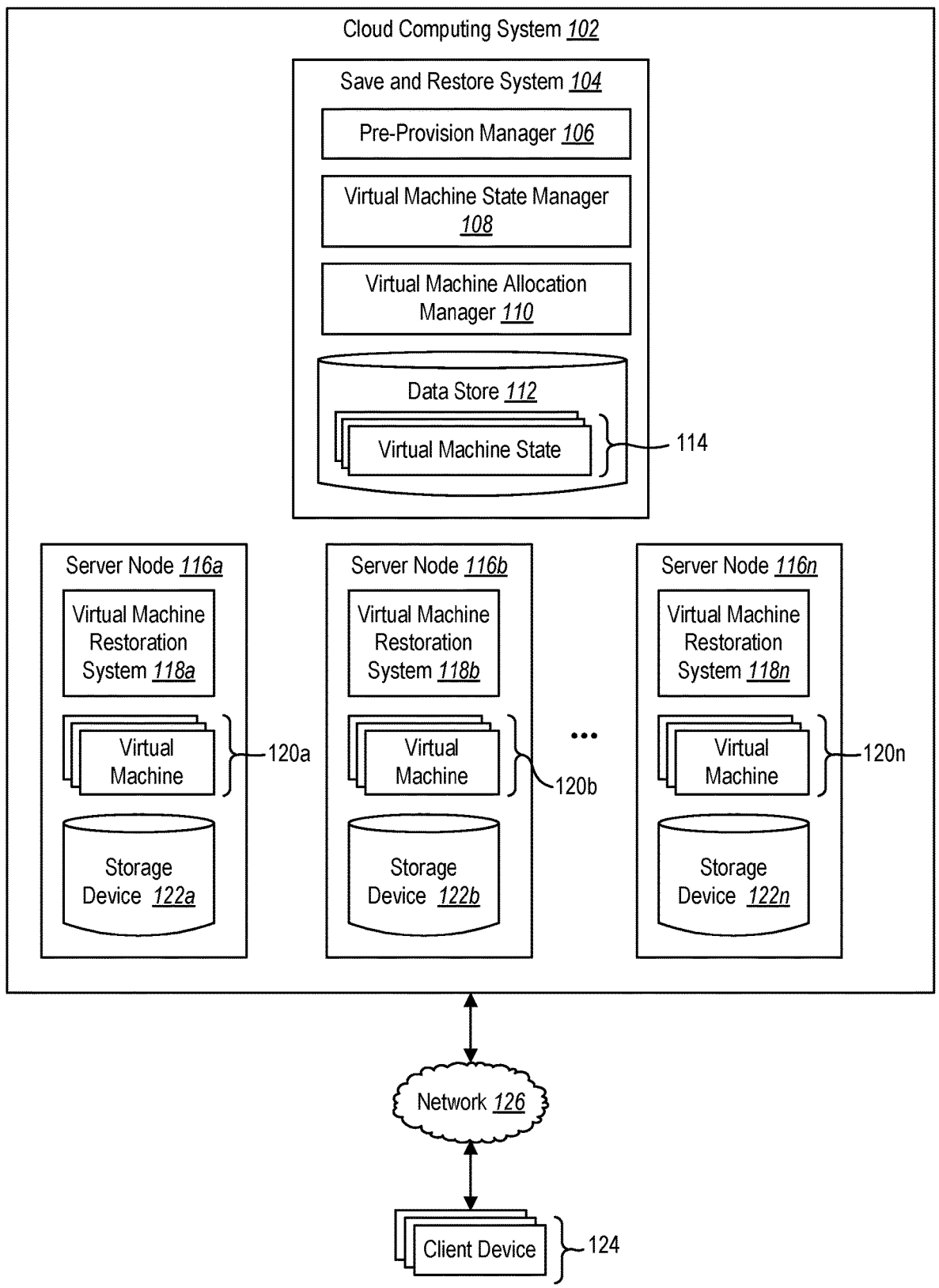
FIG. 1 illustrates an example environment of a cloud computing system including a save and restore system in accordance with one or more implementations.

The present disclosure is generally related to systems for saving and restoring pre-provisioned virtual machines in a way that reduces time associated with booting virtual machines (VMs) while also reducing the expense of processing resources on a cloud computing system. In particular, and as will be discussed in further detail below, systems described herein include features that facilitate pre-provisioning a VM and saving a VM state for the pre-provisioned VM to a storage space for later use. Indeed, as will be discussed below, the VM state is saved in a way that enables the VM state to be restored at a later time in response to a customer request for a VM that is compatible with the VM state. Saving the VM state in accordance with one or more implementations described herein saves processing resources while significantly decreasing the amount of time needed for processing incoming customer requests.

For example, in one or more embodiments, a save and restore system includes booting a pre-provisioned VM (e.g., a pre-booted VM prior to applying customer settings) on a server node of a cloud computing system. The save and restore system may save a VM state for the pre-provisioned VM to a storage space on the cloud computing system. In response to a customer request, the save and restore system can determine whether the VM state is compatible with the customer request. The save and restore system may additionally facilitate restoring the pre-provisioned VM on a server node (e.g., the same or different server node) of the cloud computing system based on customer configuration data received via the customer request.

As another example, in one or more embodiments, the save and restore system boots a plurality of pre-provisioned VMs on one or multiple server nodes of the cloud computing system. The pre-provisioned VMs may include the same or different types of VMs. The save and restore system can additionally save a plurality of VM states for the pre-provisioned VMs to a storage space on the cloud computing system. In response to a customer request, the save and restore system can selectively identify a VM state from the plurality of stored VM states that matches or is otherwise compatible with the customer request. The save and restore system may then restore the pre-provisioned VM on a server node based on the customer configuration data received via the customer request.

As will be discussed in further detail below, the present disclosure includes a number of practical applications having features described herein that provide benefits and/or solve problems associated with booting VMs on a cloud computing system. Some example benefits are discussed herein in connection with features and functionality provided by a save and restore system. Nevertheless, it will be appreciated that benefits explicitly discussed in connection with one or more implementations herein are provided by way of example and are not intended to be an exhaustive list of all possible benefits of the save and restore system.

As a first example, by saving VM states to a storage space, the save and restore system significantly reduces the expense of processing and memory resources on the cloud computing system associated with pre-booting VMs in anticipation of customer requests. In particular, because memory resources are generally more valuable than storage (e.g., disk storage), saving VM states to the storage space rather than occupying memory of server nodes increases the amount of allocable memory to incoming customers and/or existing VMs on the cloud computing system. Moreover, by utilizing a remote storage space (e.g., a storage space on another device) in some implementations, the save and restore system enables restoring the VM states to a wider number of target server nodes rather than being limited to the server node on which a VM is pre-provisioned.

In addition to saving processing resources and providing flexibility where a VM is deployed, the save and restore system may additionally reduce the time associated with booting VMs. Indeed, by saving and restoring VM states in accordance with one or more embodiments described herein, the save and restore system can accomplish many of the time-saving benefits of pre-provisioning VMs without occupying memory resources on the server nodes. In addition, and as will be described in further detail below, the save and restore system can implement features and functionality associated with saving a dynamic disk representative of local temporary storage that enables fast recovery of the pre-provisioned VM even where the VM is restored on a different server node than the server node on which the VM was pre-provisioned.

Features and functionality described herein additionally enables one or more systems on a cloud computing system to aggressively predict VM deployment in connection with received customer requests. For example, as a result of shifting resource utilization from memory to storage, the save and restore system enables prediction systems on a cloud computing system to aggressively predict upcoming customer trends without worry that memory resources are being over-utilized or over-allocated. In one or more embodiments described herein, the save and restore system can save a number of VM states representative of an overprediction of VM requests with minimal expense of processing and storage resources. This overprediction significantly increases the hit rate associated with matching incoming customer requests with pre-provisioned VMs that are ready to restore and ultimately reduces the number of requests that are processed by booting a new VM from scratch.

In addition to generally increasing the hit rate for incoming customer requests, the save and restore system can also increase the hit rate associated with a variety of VMs of different and/or less predictable VM types. For example, by saving VM states associated with VM types that are less frequently deployed or deployed in a less predictable way than common VM types, prediction systems may similarly overpredict VM deployment for less predictable VM types without suffering from decreased availability of more valuable computing resources, such as memory and central processing units (CPUs). In this way, the save and restore system expands benefits of faster boot times while reducing processing costs that would otherwise be involved in pre-provisioning VMs having less predictable deployment patterns.

As illustrated in the foregoing discussion, the present disclosure utilizes a variety of terms to describe features and advantages of the systems described herein. Additional detail is now provided regarding the meaning of some of these terms. For example, as used herein, a "cloud computing system" refers to a network of connected computing devices that provide various services to computing devices (e.g., customer devices). For instance, as mentioned above, a distributed computing system can include a collection of physical server devices (e.g., server nodes) organized in a hierarchical structure including node clusters, computing zones, virtual local area networks (VLANs), server racks, fault domains, etc.

As used herein, a "virtual machine" refers to an emulation of a computer system on a server node that provides functionality of one or more applications on the cloud computing system. Virtual machines can provide functionality needed to execute one or more operating systems. In addition, virtual machines can make use of hypervisors on processors of server devices that support virtual replication of hardware. It will be understood that while one or more examples and implementations described herein relate specifically to virtual machines, features and functionality described in connection with examples that involve virtual machines may similarly apply to other cloud-based services (e.g., containers) hosted on server nodes of a cloud computing system.

As used herein, a "pre-provisioned virtual machine" or a "pre-deployed virtual machine" refers to a pre-booted virtual machine prior to associating the VM with a customer and/or applying customer settings thereon. For example, a pre-provisioned VM may refer to a virtual machine that has been loaded on a server node and for which memory resources, storage resources, and/or networking resources have been allocated, but which has not yet been assigned or otherwise associated with a customer of a cloud computing system. In one or more embodiments described herein, a pre-provisioned VM refers to a VM having an associated local disk (e.g., a resource disk), memory allocation, and a network interface controller (NIC) on a server node. In one or more embodiments, a pre-provisioned VM is referred to as a VM in standby and awaiting assignment of a customer.

As used herein, a "virtual machine state" refers to a state of a VM at a time when data representative of the VM has been captured and saved. For example, a VM state may include an OS state representative of a temporary local storage for a VM (e.g., a pre-provisioned VM). The VM state may also include a memory state (e.g., a memory snapshot and/or journal entries that may be used to reconstruct a state of memory) representative of memory data for the VM and configuration data for the VM (e.g., core count, core types, device ports). In one or more embodiments, the VM state includes network information, such as configurable parameters that enable a rebooted VM to be attached to one or multiple NICs (e.g., logical NICs). As will be discussed in further detail below, the VM state may include a full representation of a pre-provisioned VM as deployed on a server node prior to saving the VM data. Alternatively, the VM state may include a partial representation including information that enables the pre-provisioned VM to be restored on any of a number of server nodes of a cloud computing system.

As mentioned above, a VM state may be restored on a server node after some period of time and in response to a customer request. As used herein, a "restored VM" or "fully deployed VM" refers to a VM that has been rebooted or otherwise recreated on a target server node based on information from a VM state previously saved and stored on a storage space of the cloud computing system. The restored VM may include similar features as a pre-provisioned VM as originally created in addition to customer settings that have been applied to the VM based on a received customer response.

As used herein, a "customer request" refers to any data associated with a request by a customer of a cloud computing system associated with deploying a VM on the cloud computing system. For example, a customer request may refer to customer configuration data including specifications or parameters of a VM that a customer selects. In one or more embodiments, a customer request includes an identifier for a specific type of VM (e.g., a VM having a predefined set of configurations and parameters). A customer request may include information associated with storage, memory, and/or networking settings for a VM. Indeed, a customer request may include any setting, configuration, or parameter that defines how a VM operates within the cloud computing system.

Additional detail will now be provided regarding systems for pre-provisioning VMs, saving VM states, and restoring VMs in relation to illustrative figures portraying example implementations. For example, FIG. 1 illustrates an example environment 100 including a cloud computing system 102. The cloud computing system 102 may include any number of devices. For example, as shown in FIG. 1, the cloud computing system 102 includes a save and restore system 104 that may be implemented on one or across multiple server devices of the cloud computing system 102. As will be discussed in further detail below, the save and restore system 104 may include any features and functionalities discussed herein in connection with pre-provisioning a VM, saving a VM state representative of the pre-provisioned VM, and facilitating restoration of the VM on a target server node.

As shown in FIG. 1, the save and restore system 104 includes a number of components that will be discussed in further detail herein. For example, the save and restore system 104 may include a pre-provision manager 106. The pre-provision manager 106 includes features and functionality associated with generating a pre-provisioned VM on a server node of the cloud computing system 102. In particular, the pre-provision manager 106 may pre-provision any number of VMs on one or multiple server nodes in preparation for receiving and processing any number of customer requests indicating desired specifications of VMs to be deployed on the cloud computing system 102. Additional information in connection with the pre-provision manager 106 will be discussed below.

As further shown in FIG. 1, the save and restore system 104 includes a VM state manager 108. The VM state manager 108 includes features and functionality associated with capturing a state (e.g., a snapshot) representative of a VM and storing the VM state on a storage (e.g., the data store 112) of the cloud computing system 102. For example, the VM state manager 108 may capture a VM state including local disk data and a memory snapshot representative of a pre-provisioned VM that has been pre-booted on a server node. The VM state may further be stored on a storage volume, which may refer to a remote storage space (e.g., a blob storage) or a local storage of a server node on which the VM was pre-deployed. Additional information in connection with the VM state manager 108 will be discussed below.

As further shown in FIG. 1, the save and restore system 104 includes a VM allocation manager 110. The VM allocation manager 110 may provide any features and functionality related to receiving and processing customer requests on the cloud computing system 102. For example, the VM allocation manager 110 may determine whether one or more VM states are compatible with a received one or more customer requests. The VM allocation manager 110 may further manage creation of and distribution of pre-provisioned VMs and VM states based on a predicted number of VMs to be deployed on the cloud computing system 102. Additional information in connection with the allocation manager 110 will be discussed below.

As shown in FIG. 1, the save and restore system 104 includes a data store 112. The data store 112 may include a collection of VM states 114 stored thereon and available for restoration on one or more target server nodes. The data store 112 may include storages across one or multiple computing devices on the cloud computing system 102. For example, in one or more embodiments, the data store 112 refers to a blob storage or a remote storage on one or more storage devices on the cloud computing system 102. In addition, or as an alternative, the data store 112 may refer to one or more local storages on server node(s) (e.g., server nodes 116a-n) of the cloud computing system 102. For example, in one or more embodiments, the data store 112 may include one or more local storages of storage nodes on which a VM has been pre-provisioned.

It will be appreciated that the components 106-112 of the save and restore system 104 may include hardware, software, or a combination of both. For example, the components 106-112 of the save and restore system 104 shown in FIG. 1 may include instructions stored on a computer-readable storage medium and executable by processors of one or more computing devices. When executed by the one or more processors, the computer-executable instructions of one or more computing devices (e.g., server devices) can perform one or more methods described herein. Alternatively, the components 106-112 may include hardware, such as a special purpose processing device to perform a certain function or group of functions. Additionally, or alternatively, the components 106-112 can include a combination of computer-executable instructions and hardware.

As shown in FIG. 1, the cloud computing system 102 includes a plurality of server nodes 116a-n. The server nodes 116a-n may refer to any number of server devices grouped in server racks, clusters, datacenters, and/or other hierarchies of network devices included within the cloud computing system 102. It will be appreciated that while one or more embodiments described herein refer to allocation of VMs on server nodes within a respective datacenter, other implementations may refer to more narrow groupings of server nodes (e.g., within server racks or clusters) or broader groupings of server nodes (e.g., regional and/or cloud-wide).

As shown in FIG. 1, each of the server nodes 116a-n may include similar features and components. For example, each of the server nodes 116a-n may include a VM restoration system 118a-n. The server nodes 116a-n may additionally include VMs 120a-n implemented thereon. The server nodes 116a-n may also include data storages 122a-n representative of local storages and/or remote storages accessible to the respective server nodes 116a-n. As an illustrative example, a first server node 116a may include a VM restoration system 118a, one or more VMs 120a (e.g., restored VMs), and a data storage 122a (e.g., a local storage). Each of the additional server nodes 116b-n and components 118b-n, 120b-n, 122b-n may include similar features and functionality as corresponding components on the first server node 116a.

As just mentioned, the first server node 116a may include a VM restoration system 118a. The VM restoration system 118a may provide features and functionality related to restoring one or more VM states on the server node 116a. This restoration of VM states may include deploying one or more VMs 120a based on data included within the VM states. For example, as will be described in further detail below, the VM restoration system 118a may receive customer configuration data including settings and parameters indicated within a customer request. The VM restoration system 118a may additionally receive one or more VM states that match the corresponding customer request information. The VM restoration system 118a may restore the VM state and apply the customer settings to generate or otherwise restore the VMs 120a that were previously pre-deployed on the same or a different server node(s).

As mentioned above, and as shown in FIG. 1, the server node 116a additionally includes a data storage 122a for storing any information associated with the deployed VMs 120a. For example, the data storage 122a may include local disk data, memory data (e.g., memory mappings or tracked memory usage data), and network data associated with the VMs 120a. The data storage 122a may additionally include any other information helpful for the server node 116a and VM restoration system 118a in providing functionality of the VMs to one or more customers of the cloud computing system 102.

While FIG. 1 illustrates an example implementation in which the save and restore system 104 and VM restoration system(s) 118a-n are implemented on different devices and systems of the cloud computing system 102, it will be understood that features and functionality of the individual systems and components may be implemented on the same computing device or across additional computing devices from the example shown in FIG. 1. For example, in one or more embodiments, the VM allocation manager 110 is deployed on a different device or system of devices as other components of the save and restore system 104. As another example, the VM state manager 108 and/or pre-provision manager 106 may be implemented on the same server device as a VM restoration system. Moreover, one or more features or functionalities described in connection with respective components or sub-systems may be performed by other components of the save and restore system 104 and/or VM restoration system.

As shown in FIG. 1, the environment 100 includes a plurality of client devices 124 in communication with devices of the cloud computing system 102 via a network 126. The client devices 124 may refer to various types of computing devices including, by way of example, mobile devices, desktop computers, server devices, or other types of computing devices. In one or more embodiments, one or more of the client devices 124 refer to internal devices of the cloud computing system 102 in communication with other devices of the cloud computing system 102 by way of internal communication networks and/or direct connections between devices.

The network 126 may include one or multiple networks that use one or more communication platforms or technologies for transmitting data. For example, the network 126 may include the Internet or other data link that enables transport of electronic data between respective client devices 124 and devices of the cloud computing system 102. In one or more embodiments, the client devices 124 provide customer requests (e.g., placement requests, deployment requests) of virtual machines for deployment on the respective server nodes 116a-n.

Additional detail will now be discussed in connection with the save and restore system 104 and VM restoration systems 118a-n in accordance with one or more embodiments herein. For example, FIG. 2 shows an example workflow 200 associated with pre-provisioning one or more VMs on example server nodes 202 of the cloud computing system 102.

Figure 2:
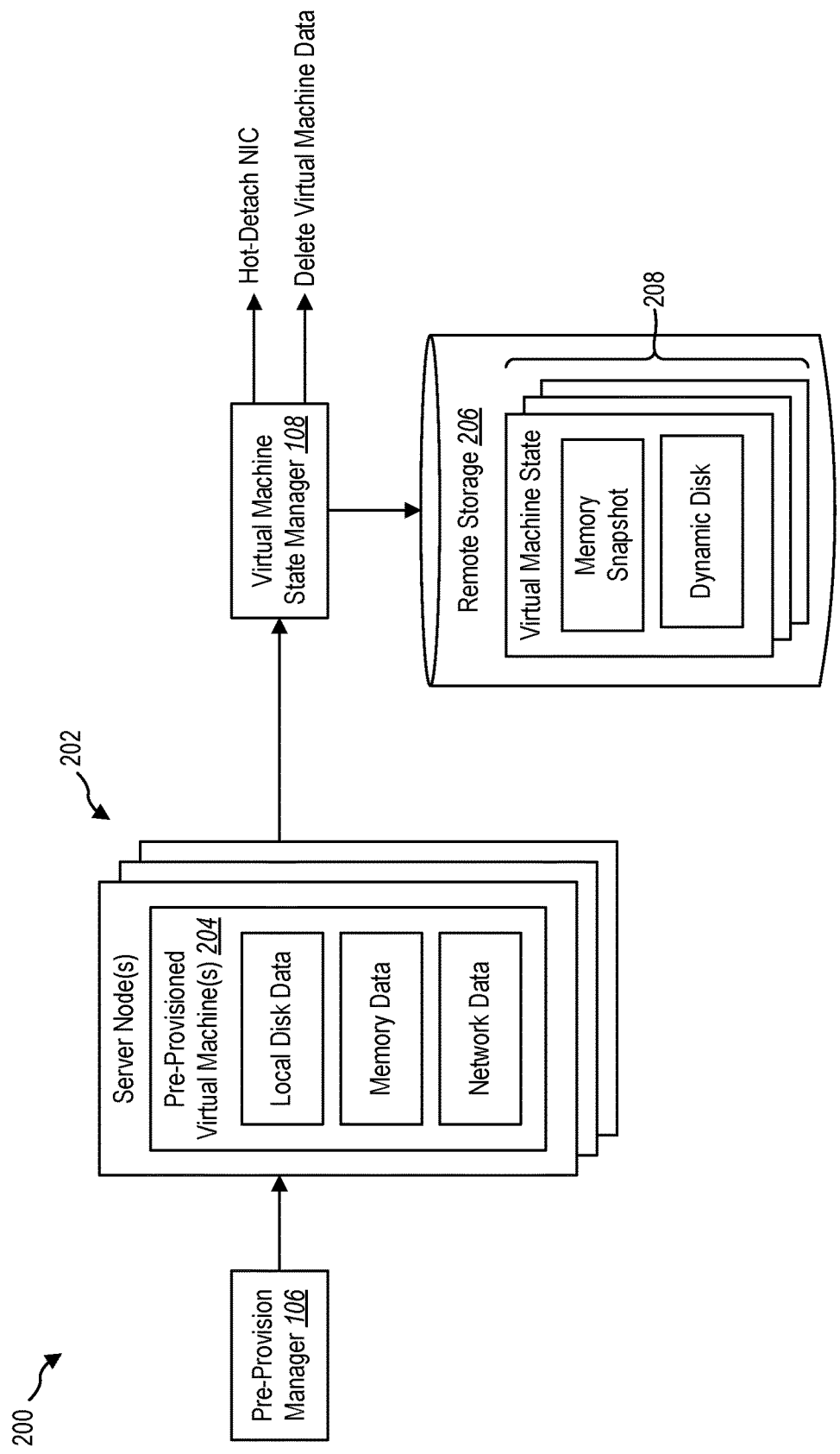
FIG. 2 illustrates a workflow showing an example implementation in which a virtual machine state for a pre-provisioned virtual machine is saved and stored on a remote storage in accordance with one or more implementations.

In particular, as shown in FIG. 2, the pre-provision manager 106 may receive instructions to boot (e.g., pre-boot) any number of pre-provisioned VMs on the cloud computing system 102. For example, in one or more embodiments, the pre-provision manager 106 receives a prediction of a number of VMs that will be needed over some period of time and a command to boot a corresponding number of pre-provisioned VMs to meet a predicted demand of customer requests for the VMs.

As shown in FIG. 2, the pre-provision manager 106 can boot any number of pre-provisioned VMs 204 on one or a plurality of server nodes 202. As shown in FIG. 2, the pre-provisioned VMs 204 include local disk data, memory data, and networking data. In particular, the pre-provisioned VMs 204 include local disk data including resource information for a VM and any information on a local storage of the VM and/or server node that enables the VM to be deployed on the server node(s) 202. The pre-provisioned VMs 204 further include memory data including any information associated with memory pages and/or memory allocation on the server node(s) 202. In one or more embodiments, the local disk data and the memory data reference one another and may include a number of dependencies that enable the OS of the VM(s) and/or host node to interact with the memory pages associated with a given VM. In one or more embodiments, modifications to one or both of the local disk and memory may result in changes to the corresponding local disk data and/or memory data.

As further shown, the pre-provisioned VMs 204 may include network data. In one or more embodiments, the network data includes information associated with a network interface controller (NIC) on the server node(s) 202 to which a corresponding pre-provisioned VM is attached. The network data may include a media access control (MAC) address for the VM and/or server node and/or a NIC identifier. In one or more embodiments, the pre-provision manager 106 utilizes information obtained from the NIC and the network data to verify a healthy status of the VM as part of the pre-provisioning process. For example, in one or more embodiments, the network data provides an indication that the pre-provisioned VM is functional within the hierarchy of the cloud computing system 102 and ready for application of customer configuration data (e.g., customer-indicated VM settings) responsive to a customer request.

As shown in FIG. 2, the pre-provisioned VMs 204 may be implemented on any number of server nodes 202. In one or more embodiments, the pre-provisioned VMs 204 are pre-booted on server nodes 202 that are set aside for the task of pre-provisioning VMs on the cloud computing system 102. By dedicating a number of server nodes 202 for the task of pre-provisioning VMs, the pre-provision manager 106 can limit processing impacts associated with pre-provisioning VMs to a select number of VMs without impacting server nodes on which fully functional VMs are deployed and servicing customers.

Moreover, by pre-booting pre-provisioned VMs 204 on the server nodes 202 independent from target server nodes on which VMs are to be ultimately deployed, the pre-provision manager 106 can perform the pre-provisioning process independent from incoming customer requests. Indeed, the pre-provision manager 106 can boot the pre-provisioned VMs 204 as a bulk process during non-peak times (or peak times) without impacting performance of any VMs that are servicing customers of the cloud computing system 102. Moreover, the pre-provision manager 106 can boot the pre-provisioned VMs 202 based on predicted VM requests rather than reactive to incoming VM requests in an effort to reduce the time expense associated with booting VMs responsive to new customer requests.

As shown in FIG. 2, the workflow 200 shows a VM state manager 108 that generates VM states 208 based on the pre-provisioned VMs 204 on the server nodes 202. In one or more embodiments, the VM state manager 108 saves VM states 208 for the pre-provisioned VMs 204 as they are created (and verified as healthy). In this way, as discussed above, the pre-provision manager 106 can re-use the same set of server nodes 202 to generate any number of pre-provisioned VMs 204 despite memory and compute core limitations of the server nodes 202.

Prior to capturing or otherwise saving data from the VM state, the VM state manager 108 can hot-detach the pre-provisioned VM from a NIC of the server node(s) 202. In particular, after verifying that the pre-provisioned VM is in working condition, the VM state manager 108 can hot-detach the NIC, disabling the pre-provisioned VM from communicating with other network devices on the cloud computing system 102.

After hot-detaching the NIC from the pre-provisioned VM, the VM state manager 108 can capture a VM state representative of the pre-provisioned VM. The VM state manager 108 may then store the VM state on a remote storage 206. The remote storage 206 may refer to a blog storage including any number of VM states 208. As used herein, a remote storage or remote storage space may refer to any storage space implemented on one or more computing devices other than a device on which the VM is pre-provisioned. In one or more embodiments, a remote storage refers to a storage on another server node of the computing device other than the server node on which the VM was pre-provisioned. As will be discussed in further detail below, the VM states 208 may be accessible to the VM allocation manager 110 for restoration of one or more of the VM states 208 respective to a customer request later received from one or more client devices 124.

As shown in FIG. 2, the VM states 208 may include a memory snapshot. The memory snapshot may be representative of a state of memory resources on a server node 202 at a time when a VM state for the pre-provisioned VM was captured. The memory state may include any information that enables restoration of the memory state on another server node at a time of capturing the VM state for the pre-provisioned VM. For example, the memory state may include a snapshot of memory pages including an indication of which portions of memory are empty, data on occupied memory spaces, etc. In one or more embodiments, the memory snapshot is representative of a state of memory at a time when the NIC was hot-detached from the pre-provisioned VM (thus ensuring that the VM state is representative of a functional and healthy VM within a framework of the cloud computing system 102).

As further shown in FIG. 2, the VM state 208 may include a dynamic disk. The dynamic disk may be representative of a local temporary storage for the VM at a time when the pre-provisioned VM was captured (e.g., at a time when the NIC was hot-detached). In one or more embodiments, the dynamic disk represents a virtual hard disk of the server node on which the pre-provisioned VM associated with the VM state was originally booted (e.g., pre-provisioned).

In saving the dynamic disk, the VM state manager 108 may capture a state of a local temporary storage that enables the VM state to be restored without re-initializing a local disk on the target server node. In one or more embodiments, this may involve saving a state of the temporary storage representative of the entire local temporary storage associated with the pre-provisioned VM. This may serve as a useful feature when restoring the pre-provisioned VM on the same server node as the server node on which the pre-provisioned VM was pre-booted. In addition, this may provide a useful feature where the local temporary storage for the VM has a high number of dirty bits or non-zero values.

Alternatively, in one or more embodiments, the VM state manager 108 saves a dynamic disk including a partial representation of a local temporary storage for the VM based on assumptions of the data thereon. For example, in one or more embodiments, the VM state manager 108 saves a dynamic disk including basic metadata of a local disk and further indicating sectors of the disk that are occupied by data. The saved metadata and/or the VM state manager 108 may assume that other bits of the local disk are zero, unoccupied, or include data that is unimportant or irrelevant for restoring the VM on a target node. This enables the state of the local disk to be restored based on only a portion of the local disk data included within the dynamic disk of the saved VM state. Moreover, saving the dynamic disk in this way enables the VM restoration system on a target server node to restore the local disk including the local disk identifier in a way that a hypervisor on the target node can accept the restored local disk rather than rejecting it.

After saving the memory snapshot and the dynamic disk within the VM states 208, the VM state manager 108 may delete or otherwise discard additional information associated with the pre-provisioned VM. For example, after hot-detaching the NIC and saving the information contained within the VM state, the VM state manager 108 can discard portions of the network information and other data that is no longer needed for restoring the VM on another server node of the cloud computing system 102.

As shown in FIG. 2, the VM state manager 108 can save and store any number of VM states 208 on the remote storage 206. In accordance with one or more examples mentioned above, the VM state manager 108 can save a number of VM states 208 based on a predicted or estimated number of VMs to be deployed responsive to a predicted number of customer requests. For example, in one or more embodiments, the VM state manager 108 can generate one-hundred thousand VMs for a particular datacenter or node cluster based on a prediction that customer requests for one-hundred thousand VMs will be received within an upcoming period of time. In this way, the VM state manager 108 can ensure that a corresponding number of VM states are ready to go responsive to a predicted number of customer requests.

Saving VM states in this fashion enables prediction engines on the cloud computing system 102 to aggressively predict customer deployments without expending or occupying an unnecessary quantity of computing resources. For example, in one or more embodiments, the save and restore system 104 may receive a number of VM states to save and store representative of an over-estimation of VMs to be deployed on the cloud computing system 102 over a period of time. Indeed, in one or more embodiments, the save and restore system 104 can generate a number of VM states representative of VMs that would occupy more compute cores than a total number of compute cores for a specific computing zone (e.g., server rack, node cluster, datacenter) on which VMs can be deployed responsive to incoming customer requests. While overprovisioning VM states in this manner may use more storage space than is technically needed to meet demand, it may nonetheless do so without using more expensive and valuable memory resources on the cloud computing system 102.

Figure 3:
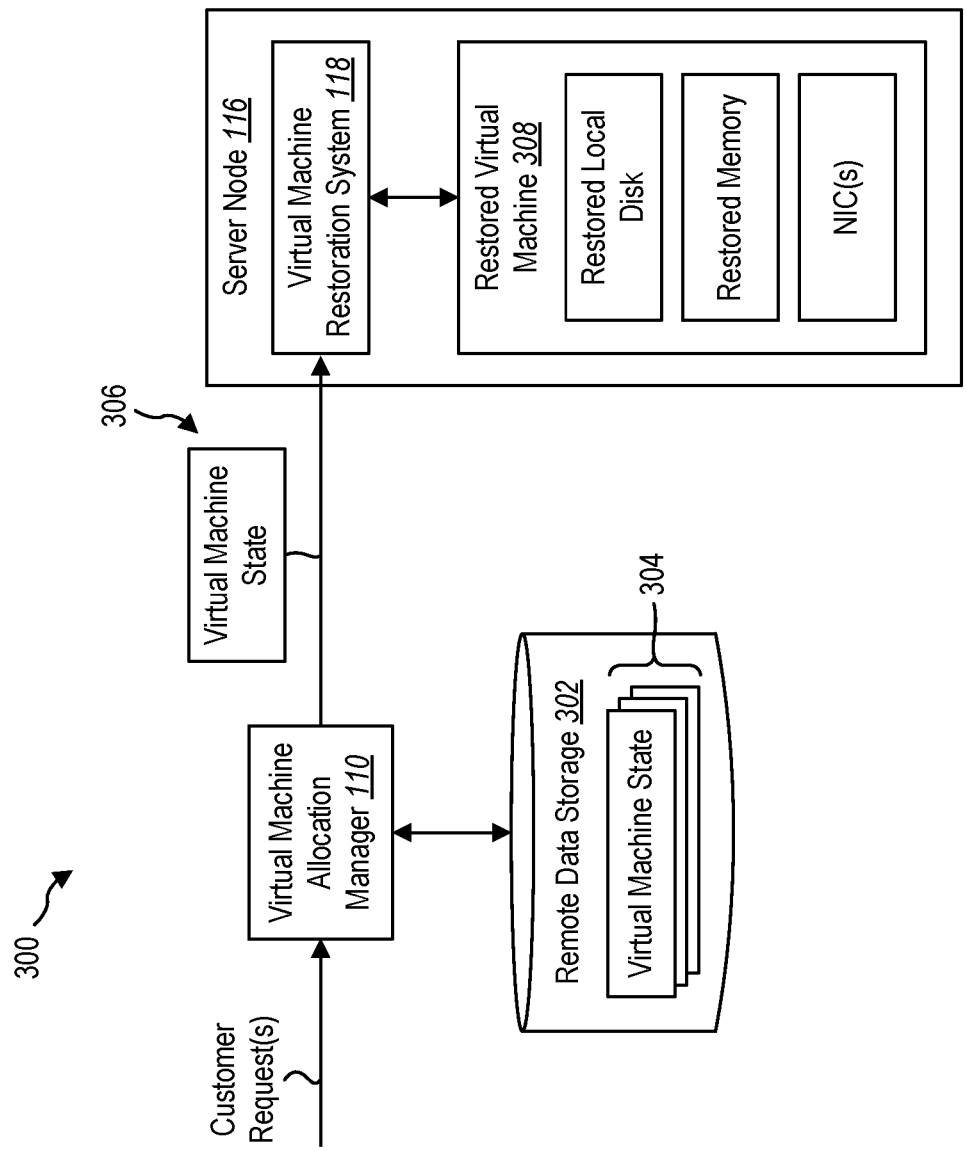
FIG. 3 illustrates a workflow showing an example implementation in which a saved virtual machine state for a pre-provisioned virtual machine is restored on a server node in accordance with one or more implementations.

Additional detail will now be given in connection with an example implementation in which a VM state is restored based on an incoming customer request. For example, FIG. 3 illustrates an example workflow 300 in which a VM allocation manager 110 (or simply "allocation manager 110") receives one or more customer requests from a customer. The allocation manager 110 can receive a customer request from an external customer (e.g., from a client device outside the cloud) or from an internal customer (e.g., from a server node within the cloud). As discussed above, the customer request may include any information associated with a VM or other service to be deployed on the cloud computing system 102 on behalf of a customer.

As shown in FIG. 3, upon receiving the customer request, the allocation manager 110 can query a VM state data store 302 including any number of VM states 304 stored thereon. The VM states 304 may include a collection of any number captured VM states of the same or different types of VMs. In one or more embodiments, the allocation manager 110 queries the VM state data store 302 to identify a VM state for a pre-provisioned VM having specifications and functionality that matches or is otherwise compatible with the received customer request(s).

As an illustrative example, the allocation manager 110 may receive a customer request indicting any of a variety of details associated with a VM to be deployed responsive to the customer request. For example, the customer request may indicate a VM type corresponding to a number of compute cores, processing bandwidth, and/or networking bandwidth (and any other VM parameters). The indicated VM type may refer to a pre-defined VM that is relatively common on the cloud computing system 102. Alternatively, the indicated VM may include custom configurations defined by a customer within the customer request including a unique combination of VM characteristics (e.g., a unique combination of compute cores, network bandwidth, computing bandwidth, or a number of NICs) that is less common on the cloud computing system 102.

As shown in FIG. 3, the allocation manager 110 can compare the data received within the customer request(s) against a collection of VM states 304 to identify a select VM state 306 having parameters that match or would otherwise be compatible with the received customer request. For example, the allocation manager 110 may identify a VM state 306 for a predefined VM type that matches the VM type identified by the customer request. Alternatively, the allocation manager 110 can identify a VM state 306 for a predefined VM type that is identical, near identical, or at least satisfies a set of minimum VM settings or parameters indicated within the customer request. For example, the allocation manager 110 can identify a VM state 306 associated with parameters that are greater than or slightly better than the parameters indicated within the customer request.

As shown in the example workflow 300, the allocation manager 110 can provide the VM state 306 to a target server node 116 including a VM restore system 118 thereon. The target server node 116 and the VM restore system 118 may include similar features described above in connection with the plurality of server nodes 116a-n and VM restore systems 118a-n described above in connection with FIG. 1.

As shown in FIG. 3, the allocation manager 110 can identify a server node 116 based on availability and compatibility of the server node 116 to handle deployment of a VM defined by the VM state 306. For example, the allocation manager 110 may select the server node 116 based on the server node 116 being an empty node or otherwise having a sufficient number of compute cores available for allocation (e.g., in accordance with a required number of compute cores needed to accommodate the VM). In one or more embodiments, the allocation manager 110 identifies a server node 116 of a similar device type or device generation as an original server node on which the pre-provisioned VM corresponding to the VM state 306 was pre-booted.

As shown in FIG. 3, the allocation manager 110 can provide the selected VM state 306 to the server node 116 for restoration by the VM restore system 118. Upon receiving the VM state 306, the VM restore system 118 can deploy the restored VM 308 on the server node 116. In particular, as shown in FIG. 3, the VM restore system 118 can deploy a restored VM 308 including a restored local disk, restored memory, and one or more NIC(s) based on information within the VM state 306 in combination with information included within the customer request.

In one or more embodiments, the VM restore system 118 restores the VM by providing a call to a hypervisor on the server node 116 having a capability to recreate a VM based on the VM state 306. In one or more embodiments, the VM restore system 118 recreates the local disk and memory to be identical or otherwise compatible with the local disk data and memory data as it existed on the pre-provisioned VM (e.g., prior to capturing the VM state 306).

The VM restore system 118 may additionally apply customer configuration data received via the customer request after restoring the VM state to the same state of the pre-provisioned VM. For example, the VM restore system 118 may assign a public IP address to the VM to make the VM accessible to a client device in communication with the cloud computing system 102. The VM restore system 118 may additionally enable network communication with the restored VM 308 via other network devices within the cloud counting system 102.

In one or more embodiments, the VM restore system 118 restores network communication with the VM by attaching (e.g., hot-attaching) one or more NICs to the restored VM 308. As an example, the VM restore system 118 can utilize a functionality provided by a hypervisor on the server node 116 that enables a virtual machine to be mapped to or otherwise associated with a logical NIC (or multiple logical NICs). In one or more embodiments, the VM is mapped to a corresponding number of NICs in accordance with a customer request. In one or more embodiments, a guest would implement logic that listens for hot-detach and hot-attach events and obtain customer settings to apply to a restored VM (e.g., hot-attaching one or multiple NICs in accordance with received customer configuration data).

Detaching and attaching NICs as disclosed herein provides flexibility in pre-provisioning and restoring VMs having varying levels of network capabilities. For example, by storing a VM state that is agnostic with regard to a number of NICs (while at least including one), the VM restore system 118 can deploy a restored VM 308 having any number of NICs without requiring that the pre-provisioned VM has a corresponding number of NICs (e.g., prior to hot-detachment of the hardware NIC). This also enables all of the VM states to be verified as healthy using a single NIC component on the server node(s) on which the VMs are pre-provisioned. Thus, even though a pre-provisioned VM may only have a single NIC attached thereto, the VM restore system 118 may nonetheless restore a VM state to deploy a restored VM 308 having any number of logical NICs in accordance with a corresponding customer request.

Figure 4:
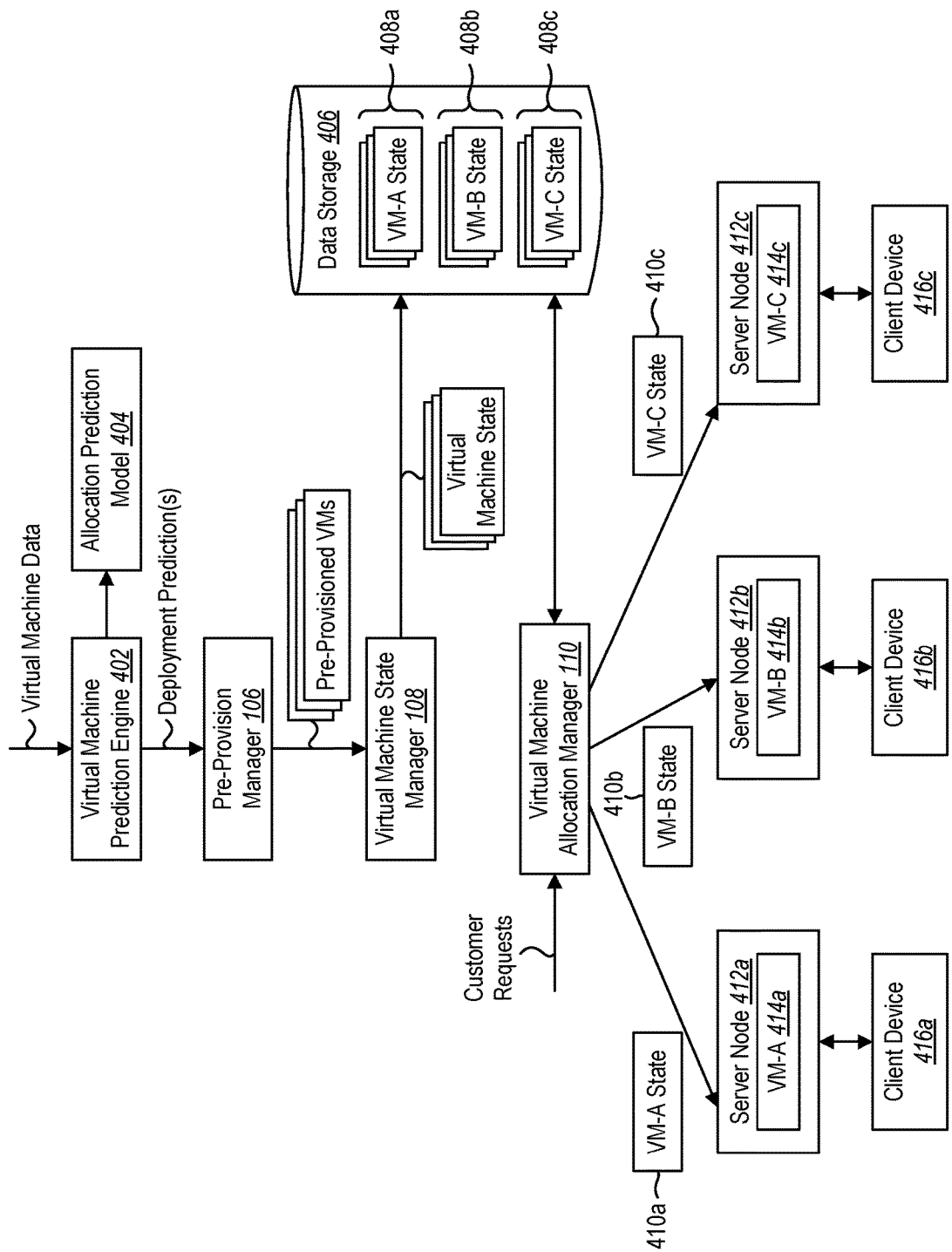
FIG. 4 illustrates an example implantation in which virtual machine states associated with different types of pre-provisioned virtual machines are stored and restored in accordance with one or more implementations.

FIG. 4 illustrates another example implementation of systems described herein in connection with saving a VM state of a pre-provisioned VM and restoring the VM state based on a customer request. In particular, FIG. 4 illustrates an example workflow 400 showing a VM prediction engine 402 that receives or otherwise collects VM deployment data (e.g., historical VM deployment data) and generates a prediction of VM deployment based on observed trends and other relevant data. In one or more embodiments, the VM prediction engine 402 utilizes an allocation prediction model 404 that is trained based on historical data to predict upcoming deployments of one or more types of VMs on a cloud computing system 102. The allocation prediction model 404 may include a machine learning model and/or algorithms developed based on historical trends of VM deployments over time.

As shown in FIG. 4, and as discussed above, the VM prediction engine 402 can provide a prediction of VM deployments to a pre-provision manager 106 to guide the pre-provision manager 106 in booting pre-provisioned VMs. In particular, the VM prediction engine 402 can provide an indication of a predicted number of VMs of different VM types that are estimated to be deployed on the cloud computing system 102 (or to a specific computing zone) over an upcoming period of time (e.g., an upcoming hour(s), day(s), week(s)). In this non-limiting example, the VM prediction engine 402 may generate a prediction of upcoming deployments for three different types of VMs (e.g., VM-A, VM-B, VM-C) having different parameters and configurations.

As mentioned above, the VM prediction engine 402 can predict a certain number of VMs to be deployed and provide instructions to the pre-provision manager 106 to pre-provision a corresponding number of VMs. In one or more embodiments, the pre-provision manager 106 boots a number of pre-provisioned VMs to accommodate a predicted number of VMs. Alternatively, in one or more embodiments, the pre-provision manager 106 may pre-provision more VMs than the allocation prediction model 404 predicts will be needed to accommodate the occasion in which more customer requests are received for corresponding types of VMs than predicted.

In one or more embodiments, the number of pre-provisioned VMs booted by the pre-provision manager 106 will exceed the total computing capacity of a set of target nodes on which the pre-provisioned VMs may be deployed. For example, in one or more embodiments, the pre-provision manager 106 may boot a number of pre-provisioned VMs that, if fully deployed, would require a greater number of compute cores than a total capacity of compute cores that are available for allocation on the cloud computing system or other computing zone capable of receiving and processing customer requests.

As shown in FIG. 4, the VM state manager 108 may generate VM states for a plurality of pre-provisioned VMs that are pre-deployed on a set of server nodes. As indicated in one or more examples above, the VM state manager 108 can generate VM states by capturing a memory snapshot and a dynamic disk, hot-detaching a NIC, and saving the captured VM state to a data storage 406. In one or more embodiments, the data storage 406 refers to a remote storage (e.g., a blog storage) including any number of VM states stored thereon. In addition, or as an alternative, in one or more embodiments, the data storage 406 refers (at least in part) to local storages of the server nodes on which the VMs are originally pre-provisioned.

As shown in FIG. 4, the data storage 406 may include a collection of VM states 408a-c of different types. For example, the data storage 406 may include a first set of VM states 408a of a first VM type (VM-A) associated with a set of VM parameters corresponding to the first VM type. As further shown, the data storage 406 may include a second set of VM states 408b of a second VM type (VM-B). The data storage 406 may also include a third set of VM states 408c of a third VM type (VM-C).

While FIG. 4 illustrates an example showing three sets of VM-states representative of three different VM types, the VM state manager 108 may generate any number of VM states corresponding to any number of VM types. For example, the VM state manager 108 can generate sets of VM states corresponding to thousands of different VM types based on different combinations of VM parameters that may be deployed on a wide variety of server nodes on the cloud computing system 102.

One or more of the sets of VMs may correspond to common or frequently used VM types. For example, a first VM type (VM-A) may refer to a commonly used VM type associated with a large number of daily VM deployments. Alternatively, a second or third VM type (e.g., VM-B or VM-C) may refer to a less commonly used or less predictable VM type associated with select customers and/or a lower number of daily VM deployments. For example, in some instances, VMs of the second or third VM-types may not be deployed on a given day, but deployed in larger volumes on other days depending on unique needs and requests of specific customers. Nevertheless, to ensure that VM states of a variety of VM-types are readily available, the VM state manager 108 can generate VM states corresponding to both common and uncommon VM types to ensure that the cloud computing system 102 is well-equipped to identify a VM state for each of a variety of different customer requests.

As shown in FIG. 4, the allocation manager 110 may receive one or more customer requests. The customer requests may indicate parameters or settings of VMs to be deployed. Based on the information included within the customer request(s), the allocation manager 110 can identify one of the different VM-types that correspond to the received customer requests. In one or more embodiments, the allocation manager 110 can obtain a corresponding VM state from the data storage 406 that matches the incoming customer request(s).

As shown in FIG. 4, the allocation manager 110 can provide VM states 410a-c to corresponding server nodes 412a-c for deployment of VMs thereon. By way of example, the allocation manager 110 can provide a first VM state (VM-A state 410a) to a first server node 412a to deploy a first restored VM (VM-A 414a) capable of servicing a first client device 416a of a first customer. As further shown, the allocation manager 110 can provide a second VM state (VM-B state 410b) to a second server node 412b to deploy a second restored VM (VM-B 414b) capable of servicing a second client device 416b of a second customer. As further shown, the allocation manager 110 can provide a third VM state (VM-C state 410c) to a third server node 412c to deploy a third restored VM (VM-C 414c) capable of servicing a third client device 416c of a third customer.

Figure 5:
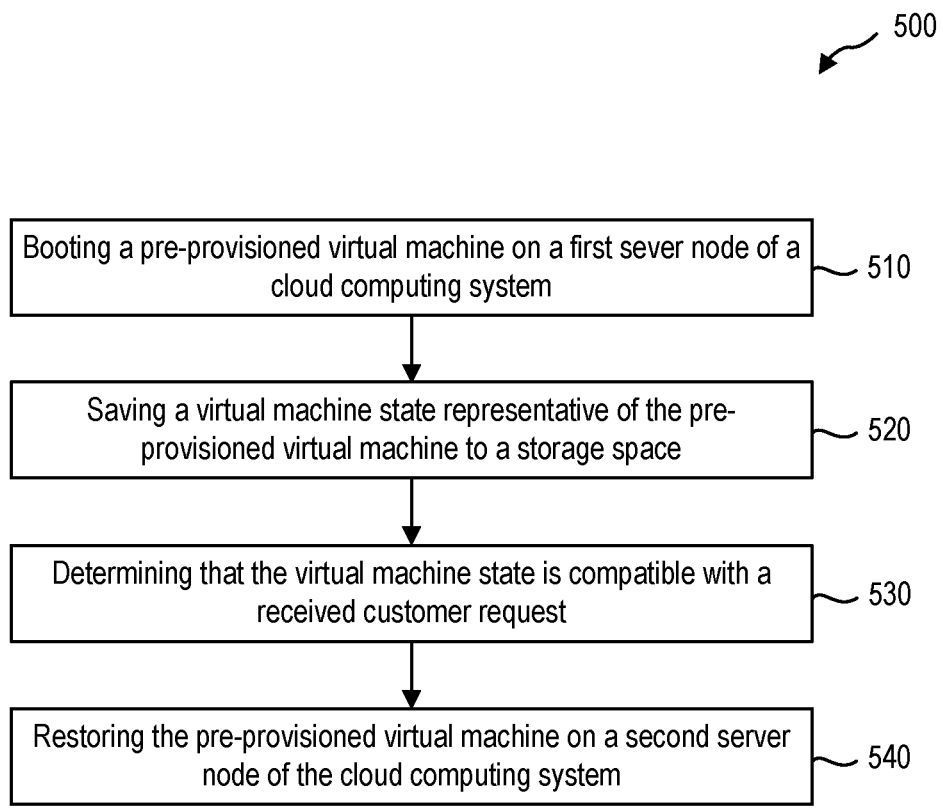
FIG. 5 illustrates an example series of acts for saving and restoring a pre-provisioned virtual machine in accordance with one or more embodiments.
Figure 6:
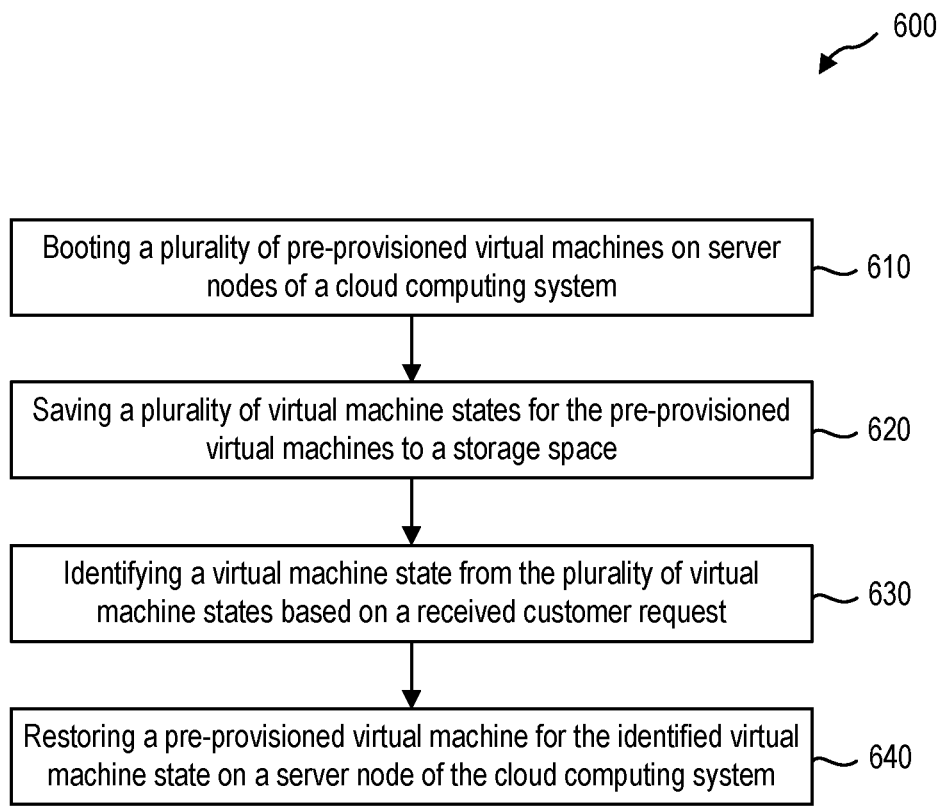
FIG. 6 illustrates an example series of acts for saving and restoring a plurality of pre-provisioned virtual machines in accordance with one or more embodiments.

Turning now to FIGS. 5 and 6, these figures illustrate example flowcharts including series of acts for saving and restoring pre-provisioned VMs in accordance with one or more embodiments described herein. While FIGS. 5 and 6 illustrate acts according to one or more embodiments, alternative embodiments may omit, add to, reorder, and/or modify any of the acts shown in FIGS. 5-6. The acts of FIGS. 5-6 can be performed as part of a method. Alternatively, a non-transitory computer-readable medium can include instructions that, when executed by one or more processors, cause a computing device to perform the acts of FIGS. 5-6. In still further embodiments, a system can perform the acts of FIGS. 5-6.

FIG. 5 illustrates a series of acts 500 for saving and restoring a pre-provisioned VM in accordance with one or more embodiments. As shown in FIG. 5, the series of acts 500 includes an act 510 of booting a pre-provisioned virtual machine (VM) on a first server node of a cloud computing system. In one or more implementations, the act 510 involves booting a pre-provisioned virtual machine on a first server node of a cloud computing system where the pre-provisioned virtual machine includes a pre-booted virtual machine prior to applying customer settings (e.g., for an associated customer of the cloud computing system).

As further shown, the series of acts 500 includes an act 520 of saving a virtual machine state representative of the pre-provisioned virtual machine to a storage space. For example, in one or more embodiments, the act 520 involves saving a virtual machine state representative of the pre-provisioned virtual machine to a storage space on the cloud computing system. In one or more embodiments, the storage space is a storage volume on a remote storage of the cloud computing system. In one or more embodiments, saving the virtual machine state includes saving a memory snapshot including a state of memory resources associated with the pre-provisioned virtual machine after verifying that the pre-provisioned virtual machine is functional within the cloud computing system.

As further shown, the series of acts 500 includes an act 530 of determining that the virtual machine state is compatible with a received customer request. For example, in one or more embodiments, the act 530 involves determining that the virtual machine state is compatible with customer configuration data received via a customer request.

As further shown, the series of acts 500 includes an act 540 of restoring the pre-provisioned virtual machine on a second server node of the cloud computing system. For example, in one or more embodiments, the act 540 involves restoring the pre-provisioned virtual machine on a second server node of the cloud computing system based on the customer configuration data received from the customer device.

In one or more embodiments, saving the virtual machine state includes saving a dynamic disk representative of a state of a local disk for the pre-provisioned virtual machine. In one or more embodiments, saving the dynamic disk includes saving metadata for the local disk indicating occupied portions of local storage on the first server node. In one or more embodiments, restoring the pre-provisioned virtual machine includes restoring a state of the local disk on the second server node based on the dynamic disk storage as it existed on the first server node.

In one or more embodiments, the series of acts 500 includes detaching a network interface controller (NIC) from the pre-provisioned virtual machine prior to saving the virtual machine state. In one or more implementations, wherein the NIC is used to verify functionality of the pre-provisioned virtual machine within a network environment of the cloud computing system prior to saving the virtual machine state. In one or more embodiments, restoring the pre-provisioned virtual machine on the second server node includes attaching one or more logical NICs to the restored pre-provisioned virtual machine based on customer configuration data received via the customer request. In one or more embodiments, the pre-provisioned virtual machine is attached to a single NIC on the first server node while the restored pre-provisioned virtual machine on the second server node includes multiple logical NICs.

FIG. 6 includes another example series of acts 600 for saving and restoring one or more pre-provisioned virtual machines. As shown in FIG. 6, the series of acts 600 includes an act 610 of booting a plurality of pre-provisioned virtual machines on server nodes of a cloud computing system. In one or more embodiments, the act 610 involves booting a plurality of pre-provisioned virtual machines on one or more server nodes of a cloud computing system where the plurality of pre-provisioned virtual machines includes pre-booted virtual machines prior to applying given sets of customer settings for associated customers of the cloud computing system.

As further shown, the series of acts 600 includes an act 620 of saving a plurality of virtual machine states for the pre-provisioned virtual machines to a storage space. For example, in one or more embodiments, the act 620 involves saving a plurality of virtual machine states for the plurality of pre-provisioned virtual machines to a storage space on the cloud computing system. In one or more embodiments, the storage space is a storage volume on a remote storage of the cloud computing system from the one or more server nodes. In one or more embodiments, the storage space is a local storage volume on at least one of the one or more server nodes of the cloud computing system where the server node is one of the one or more server nodes on which the pre-provisioned virtual machine was previously booted.

As further shown, the series of acts 600 includes an act 630 of identifying a virtual machine state from the plurality of virtual machine states based on a received customer request. In one or more embodiments, the act 630 involves identifying a virtual machine state from the plurality of virtual machine states based on determining that the virtual machine state is compatible with customer configuration data received via a customer request.

As further shown, the series of acts 600 includes an act 640 of restoring a pre-provisioned virtual machine for the identified virtual machine state on a server node of the cloud computing system. In one or more embodiments, the act 640 involves restoring a pre-provisioned virtual machine associated with the identified virtual machine state on a server node of the cloud computing system based on the customer configuration data received via the customer request.

In one or more embodiments, the plurality of pre-provisioned virtual machines includes a number of virtual machines based on a predicted number of virtual machines to be deployed for a corresponding plurality of customers of the cloud computing system. In one or more embodiments, the number of virtual machines includes an over-estimation of virtual machines to be deployed on the cloud computing system over a period of time. In one or more embodiments, the number of virtual machines represents a number of compute cores greater than a total capacity of compute cores for a plurality of server devices available for allocation of server resources in response to received customer requests.

In one or more embodiments, the series of acts 600 includes booting a second plurality of pre-provisioned virtual machines on the one or more server nodes of the cloud computing system where the second plurality of pre-provisioned virtual machines include virtual machines of a second virtual machine type different from the plurality of pre-provisioned virtual machines. The series of acts 600 may also include saving a second plurality of virtual machine states for the second plurality of pre-provisioned virtual machines to the storage space on the cloud computing system. In one or more embodiments, the virtual machine state is identified from the plurality of virtual machine states based on a comparison of the customer configuration data to virtual machine specifications associated with the plurality of pre-provisioned virtual machines and the second plurality of pre-provisioned virtual machines.

Figure 7:
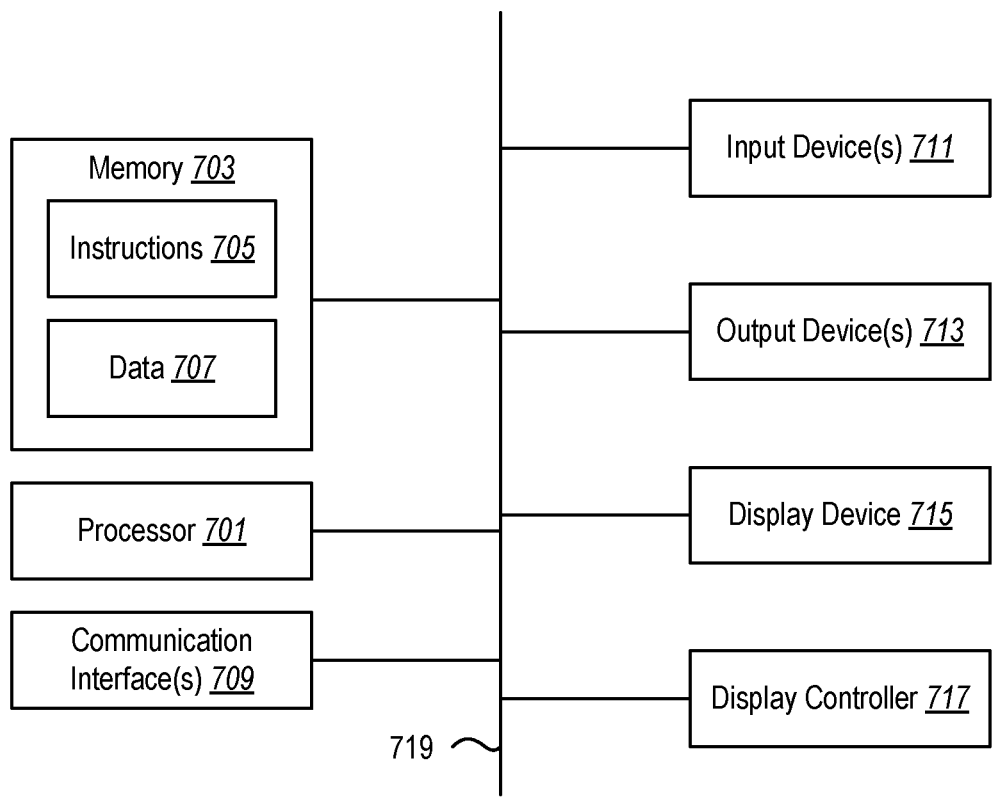
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
pre-provisioning a virtual machine including an operating system (OS) on a first server node of a cloud computing system, the pre-provisioned virtual machine including a pre-booted virtual machine prior to applying customer settings;
saving a virtual machine state representative of the pre-provisioned virtual machine to a storage space on the cloud computing system, the virtual machine state including an OS state of the pre-provisioned virtual machine;
determining that the virtual machine state is compatible with customer configuration data received via a customer request, wherein determining that the virtual machine state is compatible is based on a comparison between the virtual machine state with states associated with common and uncommon virtual machine types;
selecting a second server node to handle a deployment of a virtual machine based on the virtual machine state; and
booting the virtual machine associated with the saved virtual machine state to a running state on the second server node of the cloud computing system based on the customer configuration data received via the customer request.

2. The method of claim 1, wherein the storage space is a storage volume on a remote storage of the cloud computing system.

3. The method of claim 1, wherein saving the virtual machine state includes:
saving a memory snapshot including a state of memory resources associated with the pre-provisioned virtual machine after verifying that the pre-provisioned virtual machine is functional within the cloud computing system.

4. The method of claim 1, wherein saving the virtual machine state includes saving a dynamic disk representative of a state of a local disk for the pre-provisioned virtual machine.

5. The method of claim 4, wherein the dynamic disk includes metadata of the local disk for the pre-provisioned virtual machine indicating occupied portions of local storage on the first server node.

6. The method of claim 5, wherein booting the virtual machine associated with the saved virtual machine state to a running state includes restoring a state of the local disk on the second server node based on the dynamic disk representative of a state of a local disk on the first server node prior to capturing the state.

7. The method of claim 1, further comprising detaching a network interface controller (NIC) from the pre-provisioned virtual machine prior to saving the virtual machine state.

8. The method of claim 7, wherein the NIC is used to verify functionality of the pre-provisioned virtual machine within a network environment of the cloud computing system prior to saving the virtual machine state.

9. The method of claim 7, wherein booting the pre-provisioned virtual machine to a running state on the second server node includes attaching one or more logical NICs to the booted pre-provisioned virtual machine based on the customer configuration data received via the customer request.

10. The method of claim 9, wherein the pre-provisioned virtual machine is attached to a single NIC on the first server node, and wherein the booted pre-provisioned virtual machine on the second server node includes multiple logical NICs.

11. A method, comprising:
pre-provisioning a plurality of pre-provisioned virtual machines on a first server node of a cloud computing system, the plurality of pre-provisioned virtual machines including pre-booted virtual machines prior to applying given sets of customer settings for associated customers of the cloud computing system, the plurality of pre-provisioned virtual machines including operating systems (OSs), and wherein the plurality of pre-provisioned virtual machines include common and uncommon virtual machine types;
saving a plurality of virtual machine states for the plurality of pre-provisioned virtual machines to a storage space on the cloud computing system, the plurality of virtual machine sates including OS states of the plurality of pre-provisioned virtual machines;
identifying a virtual machine state from the plurality of virtual machine states based on determining that the virtual machine state is compatible with customer configuration data received via a customer request, wherein identifying the virtual machine state is based on a comparison between the virtual machine state with states associated with the common and uncommon virtual machine types;
selecting a second server node to handle deployment of a virtual machine based on the identified virtual machine state; and
booting the virtual machine associated with the saved virtual machine state to a running state on the second server node of the cloud computing system based on the customer configuration data received via the customer request.

12. The method of claim 11, wherein the plurality of pre-provisioned virtual machines includes a number of virtual machines based on a predicted number of virtual machines to be deployed for a corresponding plurality of customers of the cloud computing system.

13. The method of claim 12, wherein the number of virtual machines includes an over-estimation of a number of virtual machines to be deployed on the cloud computing system over a period of time.

14. The method of claim 12, wherein the number of virtual machines represents a number of compute cores greater than a total capacity of compute cores for a plurality of server devices available for allocation of server resources in response to received customer requests.

15. The method of claim 11, further comprising:
booting a second plurality of pre-provisioned virtual machines on the one or more server nodes of the cloud computing system, wherein the second plurality of pre-provisioned virtual machines include virtual machines of a second virtual machine type different from the plurality of pre-provisioned virtual machines; and saving a second plurality of virtual machine states for the second plurality of pre-provisioned virtual machines to the storage space on the cloud computing system.

16. The method of claim 15, wherein the virtual machine state is identified from the plurality of virtual machine states based on a comparison of the customer configuration data to virtual machine specifications associated with the plurality of pre-provisioned virtual machines and the second plurality of pre-provisioned virtual machines.

17. The method of claim 11, wherein the storage space is a storage volume on a storage of the cloud computing system remote from the one or more server nodes.

18. The method of claim 11, wherein the storage space is a local storage volume on at least one of the one or more server nodes of the cloud computing system, and wherein the server node is one of the one or more server nodes on which the pre-provisioned virtual machine was previously booted.

19. A system, comprising:
one or more processors;
memory in electronic communication with the one or more processors; and instructions stored in the memory, the instructions being executable by the one or more processors to:
pre-provision a virtual machine including an operating system (OS) on a first server node of a cloud computing system, the pre-provisioned virtual machine including a pre-booted virtual machine prior to applying a given set of customer settings for an associated customer of the cloud computing system;
save a virtual machine state representative of the pre-provisioned virtual machine to a storage space on the cloud computing system, the virtual machine state including an OS state of the pre-provisioned virtual machine;
determine that the virtual machine state is compatible with customer configuration data received via a customer request, wherein determining that the virtual machine state is compatible is based on a comparison between the virtual machine state with states associated with common and uncommon virtual machine types;
select a second server node to handle a deployment of a virtual machine based on the virtual machine state; and
boot the virtual machine associated with the saved virtual machine state to a running state on the second server node of the cloud computing system based on the customer configuration data received via the customer request.

20. The system of claim 19, further comprising instructions being executable by the one or more processors to detach a network interface controller (NIC) from the pre-provisioned virtual machine prior to saving the virtual machine state, wherein the NIC is used to verify functionality of the pre-provisioned virtual machine within a network environment of the cloud computing system prior to saving the virtual machine state.

* * * * *